United States Patent
Bloch et al.

(10) Patent No.: US 6,772,508 B2
(45) Date of Patent: Aug. 10, 2004

(54) FASTENER DELIVERY AND INSTALLATION SYSTEM

(75) Inventors: Daniel D. Bloch, St. Peters, MO (US); Branko Sarh, Huntington Beach, CA (US); Bruce Harman, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 56 days.

(21) Appl. No.: 10/202,258

(22) Filed: Jul. 24, 2002

(65) Prior Publication Data

US 2004/0016097 A1 Jan. 29, 2004

(51) Int. Cl.[7] .............................................. B23P 21/00
(52) U.S. Cl. ............................ 29/709; 29/714; 29/715; 29/720; 29/243.53; 29/809; 29/810; 29/816; 29/818; 29/407.09; 29/407.1; 29/524.1; 29/525.06; 221/69; 221/89
(58) Field of Search ....................... 29/407.01, 407.05, 29/407.09, 407.1, 569, 524.1, 529.05, 525.06, 34 B, 703, 705, 709, 714, 715, 720, 243.53, 271, 798, 809, 810, 816, 818; 408/13, 16, 761, 1 R; 221/64.13, 89, 131, 197, 242

(56) References Cited

U.S. PATENT DOCUMENTS

| | | | |
|---|---|---|---|
| 5,004,141 A | | 4/1991 | Young et al. |
| 5,193,717 A | | 3/1993 | Rink et al. |
| 5,588,554 A | | 12/1996 | Jones |
| 5,664,311 A | | 9/1997 | Banks et al. |
| 5,906,041 A | * | 5/1999 | Ito et al. .......................... 29/809 |
| 6,018,863 A | * | 2/2000 | Altrock .......................... 29/716 |
| 6,210,084 B1 | * | 4/2001 | Banks et al. .................... 408/97 |
| 6,357,101 B1 | | 3/2002 | Sarh et al. |

* cited by examiner

Primary Examiner—David P. Bryant
Assistant Examiner—Jermie E. Cozart
(74) Attorney, Agent, or Firm—Harness Dickey & Pierce P.L.C.

(57) ABSTRACT

A fastener delivery and installation system is provided that comprises an end effector mounted on an automated machine and operable to drill a hole through a workpiece and insert a fastener through the hole, and a fastener feed unit operable with the automated machine to deliver the fasteners through the end effector and into the workpiece. Further, a hand-held tool is operable against a second surface of the workpiece and is aligned with the end effector. Once the hand-held tool is positioned properly, a magnetic field is generated and the workpiece is clamped to enable the end effector to drill a hole through the workpiece and insert a fastener therethrough. Additionally, a detector is located on the hand-held tool for generating guidance information to inform an operator where to move the hand-held tool so as to align the hand-held tool with the end effector.

16 Claims, 3 Drawing Sheets

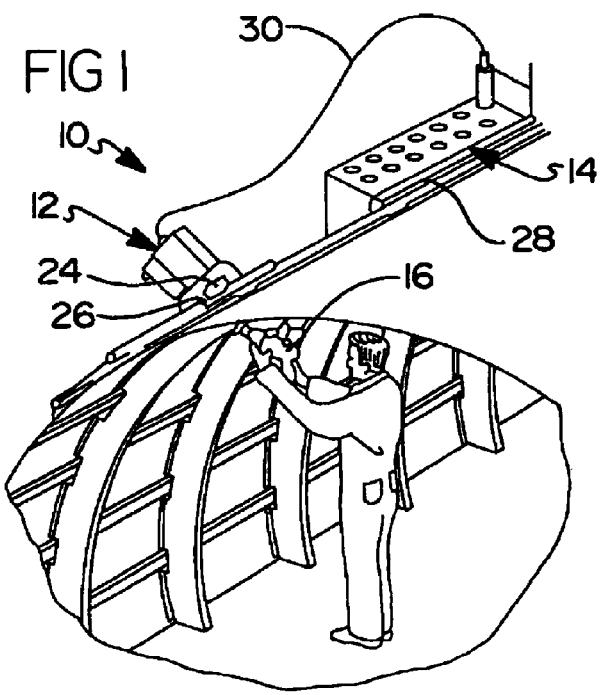
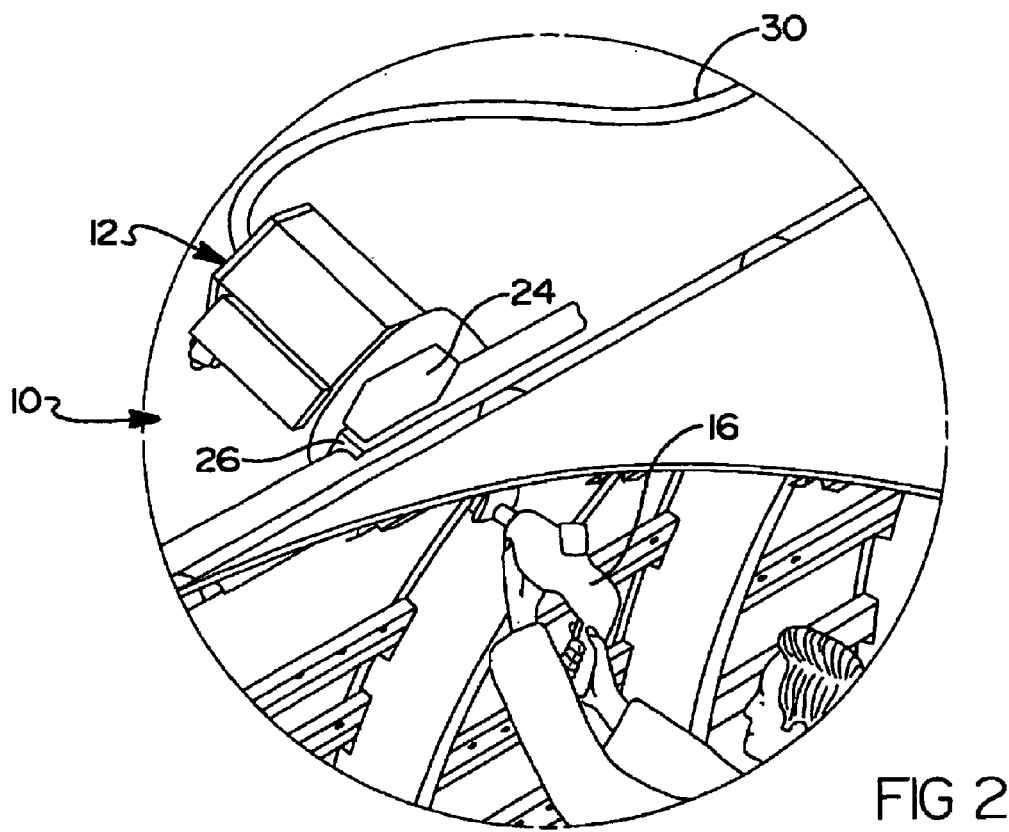

FASTENER DELIVERY AND INSTALLATION SYSTEM

FIELD OF THE INVENTION

The present invention relates generally to fastening equipment and more particularly to equipment and methods for drilling holes through a workpiece, delivering fasteners to the workpiece, and installing the fasteners into the holes.

BACKGROUND OF THE INVENTION

In the production assembly of aircraft, the majority of substructure such as fuselage frames and longerons, along with wing spars and ribs, are joined to the skin of the aircraft with thousands of fasteners. Further, a plurality of fastener types, along with variations in diameters and grip lengths, are typically used in an aircraft assembly or subassembly. (Generally, a fastener grip length refers to the cumulative thickness of the parts that the fastener holds together). Installation of fasteners in relatively large aircraft substructures and skins is typically performed either manually or by automated fastening equipment.

Manufacturing equipment that automatically delivers fasteners to a workpiece, or a fastening device, is typically employed in high rate production environments. The equipment generally comprises a storage device for the fasteners and a mechanism or system that transports fasteners from the storage device to the workpiece or fastening device. For example, U.S. Pat. No. 5,588,554 to Jones, the contents of which are incorporated herein by reference in their entirety, discloses a device for delivering fasteners to a workpiece comprising a suction head that removes fasteners from a storage area and delivers the fasteners through a delivery tube using a vacuum. The fasteners are individually stored in holes of a predetermined or fixed depth, and only one fastener may be stored in any given hole. Accordingly, each hole contains a fastener of a specific configuration, diameter, and grip length.

Yet another known art fastener delivery system is disclosed in U.S. Pat. No. 5,193,717 to Rink et al., wherein rivet cartridges are unloaded and rivets are delivered to a rivet machine or the like with pressurized air. The rivet cartridges are filled off line by a rivet pump that receives rivets from a vibrating bowl feeder, and the fasteners are delivered through a common passageway to a fastener installation tool. However, the fastener delivery system of Rink et al. requires a separate fastener escapement mechanism to remove and deliver the fasteners.

Additionally, manual fastener installation can be time consuming and cumbersome. Generally, an operator must first determine the appropriate fastener type and diameter from a blueprint or other manufacturing work instruction delivery system. Due to manufacturing variations in individual part fabrication and assembly positioning variations, the proper grip length of the fastener is often determined by manually measuring hole depths. Once the proper fastener configuration is determined, the fastener stock must then be located and selected from fastener bins, which are typically stored at a common location near the work station. A limited number of fasteners are then moved by hand from the fastener bins to the work station and are generally staged within the reach of an operator. If permitted by the work environment, several fasteners are stored in a pouch that is secured around the waist of an operator. Accordingly, the operator sorts through the fasteners to select the proper configuration and inserts the fastener directly into a hole through the parts or inserts the fastener into an installation tool that installs the fastener through the parts. As a result, a significant amount of time is spent by an operator determining the proper fastener configuration, locating the fastener within a storage bin, and transporting the fastener to the work station for installation. Therefore, manual fastener installation procedures are time consuming and thus costly.

Accordingly, a need remains in the art for a fastener delivery and installation system that efficiently delivers and installs fasteners to a work station or workpiece where parts are being assembled. The fastener delivery and installation system should be capable of delivering a plurality of different fastener configurations and should further be capable of automatically selecting the proper fastener configuration from a variety of inputs. Additionally, the fastener delivery system should also be capable of maintaining a record of fastener inventory that is preferably integrated with existing production manufacturing systems.

SUMMARY OF THE INVENTION

In one preferred form, the present invention provides an apparatus for delivering and installing fasteners to and through a workpiece that combines an automated machine and a fastener feed unit disposed on one side of the workpiece and a hand-held tool that is manipulated by an operator on the opposite side of the workpiece. The automated machine comprises an end effector supporting tools such as a drill for drilling a hole through the workpiece and a riveter for installing a rivet into the hole. Additionally, a controller positions and activates the automated machine, the end effector, and the fastener feed unit during operation of the apparatus.

The fastener feed unit comprises an unloading mechanism in communication with a fastener storage device, wherein a control system activates the unloading mechanism to remove a specific fastener configuration from the fastener storage device and transport the fastener to a delivery conduit, where the fastener is caused to be delivered through the delivery conduit, through the end effector, and into a hole in the workpiece, preferably using a pneumatic source. The fastener storage device is generally a fastener cassette that comprises a plurality of fastener storage tubes that house the fasteners. Each fastener storage tube houses a specific fastener configuration, which includes the fastener type (i.e. hi-lok, jo-bolt, rivet), diameter, and grip length. Accordingly, the fastener storage tubes range in diameter corresponding to the specific fastener configuration housed therein. Furthermore, the fastener storage device is removable from the fastener feed unit to facilitate ease of replacement when additional types of fasteners may be required or when the fastener storage device is moved to another apparatus. Moreover, a plurality of fastener cassettes may be used as necessary within the fastener feed unit.

The automated machine further comprises a guide structure, such as a pair of guide rails, adapted to be releasably affixed to or adjacent to the workpiece, along with an end effector carriage and a fastener carriage that travel along the guide structure and support the end effector and the fastener feed unit, respectively. Accordingly, the end effector and the fastener feed unit can be positioned in a desired location along the surface of the workpiece where a fastener is to be installed. Alternately, the fastener feed unit may be disposed at a fixed location while the end effector moves along the guide structure. The end effector further comprises an electromagnetic clamping device that generates a magnetic field and a positioning device that generates a positioning signal detectable on the opposite side of the workpiece.

The hand-held tool comprises a magnetic clamping block, such as a steel block or the like. When the magnetic clamping block is placed against the opposite surface of the workpiece on the side opposite from the end effector, the magnetic field of the clamping device causes the clamping block to be attracted toward the clamping device, thereby clamping the workpiece therebetween. The hand-held tool further comprises a detector for detecting the positioning signal of the positioning device, wherein the detector is operable to generate guidance information for an operator. Further, the hand-held tool may include a visual display for displaying the guidance information in graphical, audible, or other forms. Once the hand-held tool is aligned with the end effector, the controller activates the end effector and the fastener feed unit to drill a hole in the workpiece and to further deliver and install a fastener into the hole.

After fastener installation is complete, the end effector is operable to signal the operator that the operation is complete. The operator may then deactivate the hand-held tool such that the automated machine (and also the fastener feed unit if required) may be moved to a new location for subsequent fastener installations. Alternately, the end effector may automatically deactivate the electromagnetic clamping device once installation of the fastener is complete such that no action of the operator is required to release the clamping force on the workpiece.

As used herein, the term "workpiece" should be construed by those skilled in the art to be one or more parts or workpieces that are being assembled at a given location, for example a wing spar to a wing skin, or a fuselage frame to a fuselage skin. Accordingly, the term "workpiece" should not be limited to a single part or workpiece.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective cutaway view of a fastener delivery and installation system in accordance with the present invention;

FIG. 2 is an enlarged view of a portion of FIG. 1 showing the fastener delivery and installation system in greater detail in accordance with the present invention;

DETAILED DESCRIPTION OF THE PREFERRED EMBODIMENTS

Figure 3:
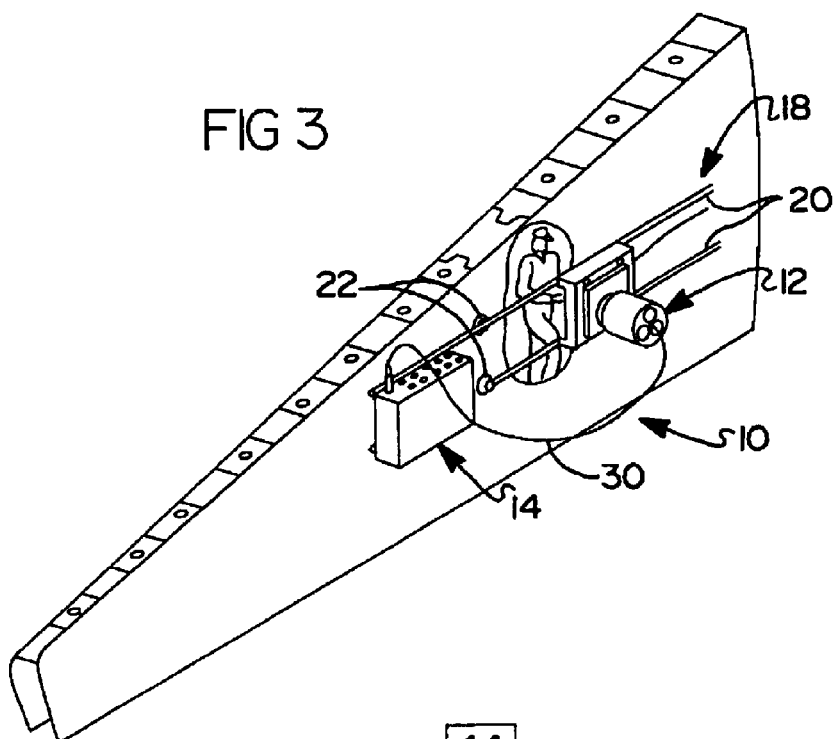
FIG. 3 is a perspective view of the fastener delivery and installation system in use on a wing box in accordance with the present invention.

The following description of the preferred embodiments is merely exemplary in nature and is in no way intended to limit the invention, its application, or uses.

Referring to the drawings, an apparatus according to the present invention is illustrated and generally indicated by reference numeral 10 in FIGS. 1 through 4, which is also referred to as a fastener delivery and installation system 10. The fastener delivery and installation system is comprised of an automated machine 12 for installing fasteners in a workpiece, as shown and described in copending application titled "Apparatus and Method for Installing Fasteners in a Workpiece," Ser. No. 09/522,222 now U.S. Pat No. 6,357,101, which is commonly assigned with the present application and the contents of which are incorporated herein by reference. The fastener delivery and installation system further comprises a fastener feed unit 14, which is shown and described in copending application titled "Portable Automatic Fastener Delivery System," Ser. No. 09/931,501 now U.S. Pat. No. 6,688,489, which is also commonly assigned with the present application and the contents of which are incorporated herein by reference.

Figure 4:
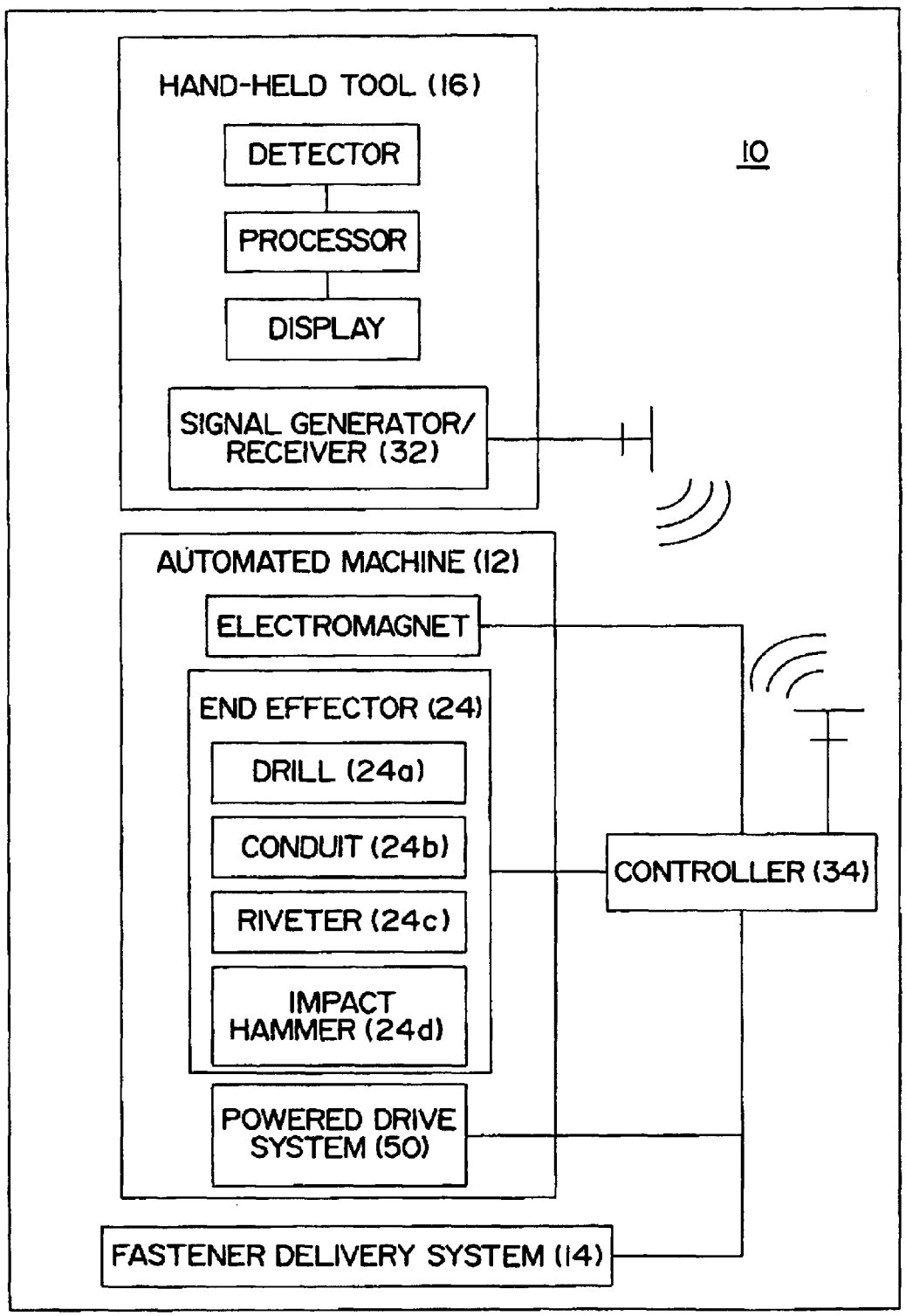
FIG. 4 is a block diagram of the fastener delivery and installation system in accordance with the present invention.

FIGS. 1 and 2 show the fastener delivery and installation system 10 in use with a fuselage section of an airframe, and FIG. 3 shows the fastener delivery and installation system 10 in use with a wing section of an airframe. FIG. 4 is a block diagram of the fastener delivery and installation system 10 with its constituent components which are described in greater detail below.

As shown, the fastener delivery and installation system 10 comprises the automated machine 12 and the fastener feed unit 14 disposed on one side of the workpiece (i.e., fuselage, wing), also referred to as a first side of the workpiece, and a hand-held tool 16 disposed on the other side of the workpiece, or along a second surface of the workpiece. The automated machine 12 is preferably supported on a guide structure 18 that advantageously can be releasably attached to the workpiece. In the illustrated embodiment, the guide structure 18 comprises a pair of parallel guide rails 20 affixed to the first surface of the workpiece by suction cups 22. The guide structure 18 could instead be affixed to the workpiece by bolts or the like, or could be supported without being attached to the workpiece, as long as the guide structure 18 is fixed relative to the workpiece.

The automated machine 12 further comprises an end effector 24 that is used to perform operations such as drilling a hole through the workpiece and installing a fastener into the hole. The end effector 24 is supported within an end effector carriage 26 that rides along the rails 20, and similarly, the fastener feed unit 14 is supported within a fastener carriage 28 that also rides along the rails 20. Alternately, the fastener feed unit 14 may be positioned at a fixed location on or proximate the rails 20 while the end effector carriage 26 rides along the rails to install subsequent fasteners. The end effector 24 advantageously comprises a drill 24a, a conduit 24b through which fasteners are delivered from the fastener feed unit 14, and/or a riveter 24c, which may be an electromagnetic riveter (EMR) or other device for use in installing other types of fasteners such as hi-loks or jo-bolts, among others. The end effector 24 may also comprise an impact hammer 24d or the like for forcing a lock bolt or similar type of fastener through a hole drilled through the workpiece. Any one of the various tools 24a-d of the end effector 24 can be moved into a working position aligned with a target location on a workpiece where a fastener is to be installed, while the other tools are held in stand-by position, and the selected tool can be operated to perform an operation on the workpiece. Operation of the end effector 24 and the hand-held tool 16, including the detector, the processor, and the display, among others, is described in greater detail in copending application Ser. No. 09/522,222 now U.S. Pat. No. 6,357,101, the contents of which have been incorporated by reference, and therefore such operation is not described herein.

As further shown, the fastener feed unit 14 is in communication with the automated machine 12 through a delivery conduit assembly 30, through which fasteners are delivered from the fastener feed unit 14 to the automated machine 12. Generally, the fasteners are delivered through a delivery conduit 30a, which is preferably a flexible material and the length of which may be adjusted according to specific application requirements, to the end effector 24 and through the end effector conduit 24b for installation through the workpiece.

Preferably, the hand-held tool 16 comprises a command signal generator 32 as shown in FIG. 4, which can be activated by the operator, such as by pulling a trigger or operating a similar type of switch device. The command signal generator 32 generates a command signal that is received by the automated machine 12, and more specifically by a controller 34 that positions and activates the automated machine 12, the end effector 24, and the fastener feed unit 14. For example, the command signal generator 32 may transmit an RF signal, and the controller 34 may include a receiver for receiving the RF signal, thereby facilitating communication between the operator and the controller 34.

Figure 5:
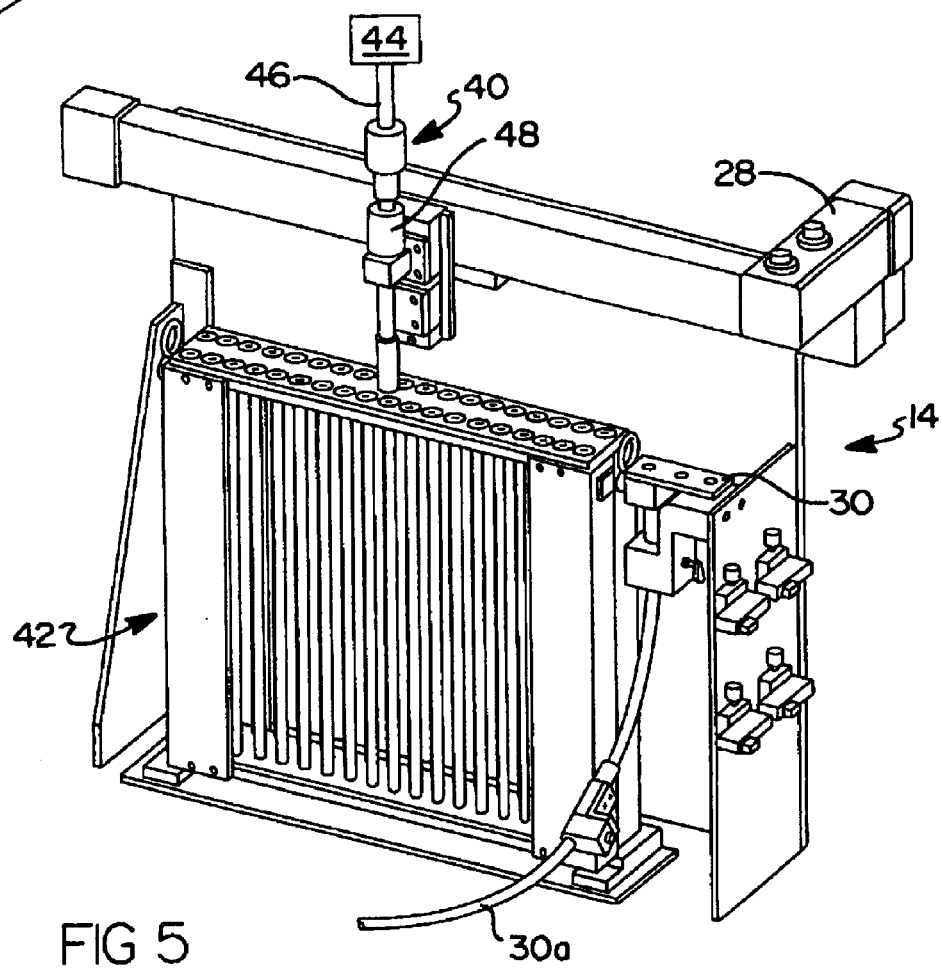
FIG. 5 is a perspective view of a fastener feed unit in accordance with the present invention.

Referring now to FIG. 5, the fastener feed unit 14 according to the preferred form of the present invention is shown in greater detail. The fastener feed unit 14 comprises an unloading mechanism 40 in communication with a fastener storage device 42, wherein the controller 34 (not shown) causes the unloading mechanism 40 to remove a fastener having a specific configuration from the fastener storage device 42 and transport the fastener to the delivery assembly conduit 30, wherein the fastener is delivered to the end effector 24 (not shown). The fastener feed unit 14 generally removes and delivers fasteners using a pneumatic source 44, which is preferably 90 psi (pounds per square inch) shop air. The pneumatic source 44 is activated by the controller 34 and is in communication with both the unloading mechanism 40 and the delivery conduit assembly 30 through flexible tubing 46. (The fittings that connect the pneumatic source 44 and the flexible tubing 46 are not shown for clarity). The pneumatic source 44 activates one or a plurality of vacuum generators 48 to remove a fastener from the fastener storage device 42 and secure the fastener within the unloading mechanism 40. Once the fastener is secured within the unloading mechanism 40, the controller 34 positions the unloading mechanism 40 adjacent the delivery conduit assembly 30, wherein the vacuum generators 48 are deactivated and the fastener falls and is transported through the delivery conduit 30a by gravity and by pressurized air from the pneumatic source 44. Operation of the fastener feed unit 14, including the delivery conduit assembly 30, the fastener storage device 42, and the unloading mechanism 40, among others, is described in greater detail in copending application Ser. No. 09/931,501 now U.S. Pat. No. 6,688,489, which as been incorporated by reference, and thus are not further described herein for purposes of clarity.

In operation, the controller 34 activates the end effector 24 to generate a magnetic field for clamping the workpiece between the end effector 24 and the hand-held tool 16. The controller 34 then activates the end effector 24 to drill a hole through the workpiece. After the hole is drilled, the controller 34 activates the fastener feed unit 14 to deliver the required fastener through the delivery conduit assembly 30, through the end effector 24, through the end effector conduit 24b, and into the hole in the workpiece. Next, the controller 34 activates the end effector 24 to install the fastener in the hole using, for example, the impact hammer 24d. When installation of the fastener is completed, the controller 34 can signal the operator to deactivate the magnetic field produced by the end effector 24 so that the automated machine 12, and the fastener feed unit 14 if applicable, can be moved along the rails 20 to the next location at which a fastener is to be installed.

The automated machine 12 preferably comprises a powered drive device 50 (FIG. 4) for moving the automated machine 12 and/or the fastener feed unit 14 along the rails 20 to a new location. The powered drive device 50 advantageously is controlled by the controller 34 so as to accurately position the automated machine 12 and/or the fastener feed unit 14 in a predetermined location along the workpiece. Further, the controller 34 may comprise a control system as shown and described the copending application Ser. No. 09/931,501 now U.S. Pat. No. 6,688,489, which has been incorporated by reference, or the control system may be a separate component of the fastener delivery and installation system 10 that is in communication with the controller 34. The design of a suitable controller 34 and/or control system is well within the capabilities of a machine designer of ordinary skill in the art of automated machine design and thus will not be further described herein.

Although the present invention discloses a system for the delivery of fasteners, other types of components may also be removed and delivered according to the teachings of the present invention for a variety of applications. For example, the system may be employed to deliver detail parts for an assembly or even components for other applications such as food delivery, mail delivery, and a wide range of other applications. Accordingly, the delivery and installation of fasteners for aircraft assembly operations shall not be construed as limiting the scope of the present invention.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. An apparatus for delivering and installing fasteners to and through a workpiece comprising:

an automated machine movable along a first surface of the workpiece;

an end effector mounted on the automated machine and operable to drill a hole through the workpiece and insert a fastener through the hole, the end effector comprising an electromagnetic clamping device that generates a magnetic field;

a positioning device located proximate the end effector and operable to generate a positioning signal that is detectable proximate a second surface of the workpiece on an opposite side from the first surface;

a fastener feed unit operable with the automated machine to deliver the fasteners through the end effector and into the workpiece;

a controller that positions and activates the automated machine, the end effector, and the fastener feed unit;

a hand-held tool comprising a magnetic clamping block disposed against the second surface of the workpiece and aligned with the electromagnetic clamping device, wherein when the magnetic field is generated, the workpiece is clamped between the magnetic clamping block and the electromagnetic clamping device to enable the end effector to drill a hole through the workpiece and insert a fastener therethrough; and a detector located on the hand-held tool for detecting the positioning signal and for generating guidance information to inform an operator where to move the hand-held tool so as to align the magnetic clamping block with the electromagnetic clamping device.

2. The apparatus according to claim 1, wherein the fastener feed unit further comprises: a fastener storage device; an unloading mechanism in communication with the fastener storage device; and a delivery conduit in communication with the unloading mechanism and the automated machine, wherein the controller activates the unloading mechanism to retrieve at least one fastener from the fastener storage device, thereby causing the fastener to be transported through the delivery conduit and to the end effector.

3. The apparatus according to claim 1, wherein the hand-held tool further comprises a command signal generator operable to generate a command signal upon activation by the operator, and the end effector being operable to receive the command signal and to activate the electromagnetic clamping device to generate the magnetic field such that the electromagnetic clamping device and the magnetic clamping block clamp the workpiece therebetween.

4. The apparatus according to claim 1, wherein the hand-held tool further comprises a visual display for displaying the guidance information.

5. The apparatus according to claim 1, wherein the automated machine further comprises: a guide structure fixed relative to the workpiece, the guide structure comprising at least one guide member extending along the first surface; an end effector carriage mounted on the guide structure and movable along the guide member, the end effector being mounted on the carriage; and a fastener carriage mounted on the guide structure and movable along the guide member, the fastener feed unit being mounted on the carriage.

6. The apparatus according to claim 5, wherein the guide structure comprises a pair of parallel guides along which the carriages move.

7. The apparatus according to claim 5, wherein the guide structure is releasably attachable to the workpiece.

8. The apparatus according to claim 1, wherein the fastener storage device further comprises at least one fastener cassette that is removably disposed within the fastener feed unit.

9. The apparatus according to claim 8, wherein the fastener cassette further comprises a plurality of fastener storage tubes that house a plurality of fastener configurations.

10. An apparatus for delivering and installing fasteners to and through a workpiece comprising: an automated machine movable along a first surface of the workpiece; an end effector mounted on the automated machine and operable to drill a hole through the workpiece and insert a fastener through the hole, the end effector comprising an electromagnetic clamping device that generates a magnetic field; a positioning device located proximate the end effector and operable to generate a positioning signal that is detectable proximate a second surface of the workpiece on an opposite side from the first surface; a fastener feed unit operable with the automated machine to deliver the fasteners through the end effector and into the workpiece; and a controller that positions and activates the automated machine, the end effector, and the fastener feed unit.

11. The apparatus according to claim 10, wherein the fastener feed unit further comprises: a fastener storage device; an unloading mechanism in communication with the fastener storage device; and a delivery conduit in communication with the unloading mechanism and the automated machine, wherein the controller activates the unloading mechanism to retrieve at least one fastener from the fastener storage device, thereby causing the fastener to be transported through the delivery conduit and to the end effector.

12. The apparatus according to claim 10, wherein the automated machine further comprises: a guide structure fixed relative to the workpiece, the guide structure comprising at least one guide member extending along the first surface; an end effector carriage mounted on the guide structure and movable along the guide member, the end effector being mounted on the carriage; and a fastener carriage mounted on the guide structure and movable along the guide member, the fastener feed unit being mounted on the carriage.

13. The apparatus according to claim 12, wherein the guide structure comprises a pair of parallel guides along which the carriages move.

14. The apparatus according to claim 12, wherein the guide structure is releasably attachable to the workpiece.

15. The apparatus according to claim 10, wherein the fastener storage device further comprises at least one fastener cassette that is removably disposed within the fastener feed unit.

16. The apparatus according to claim 15, wherein the fastener cassette further comprises a plurality of fastener storage tubes that house a plurality of fastener configurations.

\* \* \* \* \*